(12) United States Patent
Chung et al.

(10) Patent No.: US 9,852,696 B2
(45) Date of Patent: Dec. 26, 2017

(54) DISPLAY DEVICE

(71) Applicant: Samsung Display Co., Ltd., Yongin (KR)

(72) Inventors: Jinmin Chung, Yongin-si (KR); Sooyong Yoon, Seoul (KR); Sunggi Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 13 days.

(21) Appl. No.: 14/743,489

(22) Filed: Jun. 18, 2015

(65) Prior Publication Data

US 2016/0093251 A1   Mar. 31, 2016

(30) Foreign Application Priority Data

Sep. 29, 2014 (KR) .................. 10-2014-0130147

(51) Int. Cl.
| | |
|---|---|
| *G09G 5/00* | (2006.01) |
| *G06F 3/038* | (2013.01) |
| *G09G 3/3275* | (2016.01) |
| *G01J 1/42* | (2006.01) |
| *G01J 1/02* | (2006.01) |
| *G09G 3/3225* | (2016.01) |
| *G01J 1/04* | (2006.01) |

(Continued)

(52) U.S. Cl.
CPC .......... *G09G 3/3275* (2013.01); *G01J 1/0271* (2013.01); *G01J 1/0403* (2013.01); *G01J 1/42* (2013.01); *G09G 3/3225* (2013.01); *G01J 1/32* (2013.01); *G06F 1/1607* (2013.01); *G09G 2320/0233* (2013.01); *G09G 2320/0257* (2013.01); *G09G 2320/045* (2013.01); *G09G 2320/048* (2013.01); *G09G 2320/0626* (2013.01); *G09G 2360/14* (2013.01); *G09G 2360/145* (2013.01); *G09G 2360/147* (2013.01); *G09G 2360/16* (2013.01)

(58) Field of Classification Search
CPC ..... G09G 2300/0421; G09G 2300/043; G09G 2300/0426; G09G 2320/045

See application file for complete search history.

(56) References Cited

U.S. PATENT DOCUMENTS

2004/0183759 A1*  9/2004  Stevenson ............... G02B 6/43
345/82
2007/0080905 A1*  4/2007  Takahara ............ G09G 3/3233
345/76

(Continued)

FOREIGN PATENT DOCUMENTS

| KR | 10-2009-0055410 | 6/2009 |
|---|---|---|
| KR | 10-2009-0060052 | 6/2009 |
| KR | 10-2009-0111120 | 10/2009 |

*Primary Examiner* — Kent Chang
*Assistant Examiner* — William Lu
(74) *Attorney, Agent, or Firm* — H.C. Park & Associates, PLC

(57) ABSTRACT

A display device includes a first substrate, a second substrate disposed opposite to the first substrate, a connector connected to a first surface of each of the first and second substrates and covering at least a portion of side surfaces of each of the first and second substrates, a photo sensor disposed on the connector and facing the side surface of the first substrate, and a fixing member disposed between the first substrate and the connector, in which the photo sensor is inserted into the fixing member.

20 Claims, 10 Drawing Sheets

(51) Int. Cl.
*G06F 1/16* (2006.01)
*G01J 1/32* (2006.01)

(56) References Cited

U.S. PATENT DOCUMENTS

| | | | |
|---|---|---|---|
| 2007/0229452 A1* | 10/2007 | Sano | G09G 3/3406 345/102 |
| 2009/0262276 A1* | 10/2009 | Jeong | G02B 6/0085 349/58 |
| 2011/0036712 A1* | 2/2011 | Kusaka | A61B 5/00 204/403.01 |
| 2011/0109532 A1* | 5/2011 | Choi | H01L 27/3269 345/76 |
| 2011/0191042 A1* | 8/2011 | Chaji | G09G 3/32 702/64 |
| 2011/0227487 A1* | 9/2011 | Nichol | G02B 6/0018 315/158 |
| 2012/0224117 A1* | 9/2012 | Miyazaki | G02F 1/13318 349/58 |
| 2013/0222729 A1* | 8/2013 | Wu | G02F 1/133308 349/58 |
| 2014/0132578 A1* | 5/2014 | Zheng | G09G 5/10 345/207 |
| 2014/0178618 A1* | 6/2014 | Tanabe | B32B 3/02 428/38 |
| 2014/0183342 A1* | 7/2014 | Shedletsky | G06F 1/1637 250/215 |

* cited by examiner

DISPLAY DEVICE

CROSS-REFERENCE TO RELATED APPLICATION

This application claims priority from and the benefit of Korean Patent Application No. 10-2014-0130147, filed on Sep. 29, 2014, which is hereby incorporated by reference for all purposes as if fully set forth herein.

BACKGROUND

Field

Exemplary embodiments of the present invention relate to stably fixing a photo sensor to a display panel.

Discussion of the Background

Flat panel display devices such as a liquid crystal display (LCD) and an organic light emitting display device may include electrode pairs that generate an electric field and an electro-optical active layer disposed therebetween. The liquid crystal display may include a liquid crystal layer as the electro-optical active layer, and the organic light emitting display may include an organic light emitting layer as the electro-optical active layer.

Organic light emitting displays may emit light and realize colors by recombining electrons and holes injected from an anode and a cathode in a light emitting unit, and have a laminated structure where a light emitting layer may be disposed between a pixel electrode serving as the anode and a counter electrode serving as the cathode.

Among the flat panel display devices, the organic light emitting display may have a small brightness decrease according to a viewing angle, by virtue of self-light-emission. However, the organic light emitting display may have an image sticking phenomenon that reduces luminance as duration of use time increases. In order to prevent the image sticking phenomenon, a photo sensor may be equipped outside of a display device to detect luminance of an organic light emitting diode (OLED, i.e., an organic light emitting element) and compensate the luminance when the luminance is decreased. However, when a photo sensor is attached outside of the display device, the photo sensor and a light emission surface of the display panel may be misaligned, which may produce inaccurate detected luminance values.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a display device that aligns a photo sensor with a light emission surface of a display panel.

Additional aspects will be set forth in the detailed description which follows, and, in part, will be apparent from the disclosure, or may be learned by practice of the inventive concept.

According to an exemplary embodiment of the present invention, a display device includes a first substrate, a second substrate disposed opposite to the first substrate, a connector connected to a first surface of each of the first and second substrates and covering at least a portion of side surfaces of each of the first and second substrates, a photo sensor disposed on the connector and facing the side surface of the first substrate, and a fixing member which is disposed between the first substrate and the connector, in which the photo sensor is inserted into the fixing member.

At least a portion of the first substrate may be inserted into the fixing member, and the fixing member may include an aperture configured to pass light therethrough.

The photo sensor may be inserted into the fixing member and faces the aperture of the fixing member.

The fixing member may include a first portion disposed on the first surface of the first substrate, a second portion opposite to the first portion and disposed on a second surface of the first substrate, and a side wall portion connecting the first and second portions, in which the side wall portion may include an inserting groove.

The photo sensor may be disposed on the inserting groove.

The fixing member may contact the first and second surfaces of the first substrate, and the first surface may be opposite to the second surface.

The display device may further include a driving-chip mounting film connected to the display panel and configured to apply a driving signal to the display panel, and a printed circuit board (PCB) connected to the driving-chip mounting film.

A first end portion of the connector may be connected to the PCB.

The fixing member may be disposed between the driving-chip mounting films.

The display device may further include an optical film disposed between the photo sensor and the fixing member.

The fixing member may be connected to the connector.

The fixing member may further include a coupling protrusion.

The connector may further include a coupling hole into which the coupling protrusion is inserted.

The connector may be an flexible printed circuit board (FPCB).

The first substrate may include a display area and a non-display area, and the photo sensor may be configured to measure a luminance value of a pixel disposed on the non-display area.

The display device may further include a compensated image data generator configured to calculate a first compensation amount based on the measured luminance value and an accumulated light emission time of a first OLED disposed on the non-display area, calculate a second compensation amount based on an accumulated light emission time of a second OLED disposed on the display area, and compensate image data of the second OLED according to the second calculated compensation amount.

The compensated image data generator may include a memory storing an initial luminance value, a timer configured to measure an accumulated light emission time of the first OLED, a data adder configured to accumulate and add image data corresponding to the second OLED disposed on the display area, a compensation amount calculator configured to calculate the second compensation amount of image data corresponding to the accumulated light emission time of the second OLED, based on the measured luminance value, the initial luminance value, and the accumulated light emission time of the first OLED, and an image data compensator configured to detect the accumulated light emission time of the second OLED and modify image data of the second OLED according to the second compensation amount that corresponds to the detected accumulated light emission time.

The compensation amount calculator may be configured to calculate a decreased luminance degree based on the measured luminance value and the initial luminance value, and yield an increased accumulated light emission time corresponding to the calculated decreased luminance degree as the compensation amount.

The compensated image data generator may further include a lookup table configured to store the first compensation amount calculated by the compensation amount calculator according to corresponding accumulated light emission time of the first OLED.

A portion of the first substrate having a chamfered edge may be inserted to the fixing member.

According to aspects of exemplary embodiments of the present invention, a display device is designed so that light emitted from a display panel may be stably detected, an amount of light may be sufficiently acquired to detect luminance of a dummy pixel by collecting light emitted from the display panel, and pixel deterioration may be compensated using the detected luminance.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
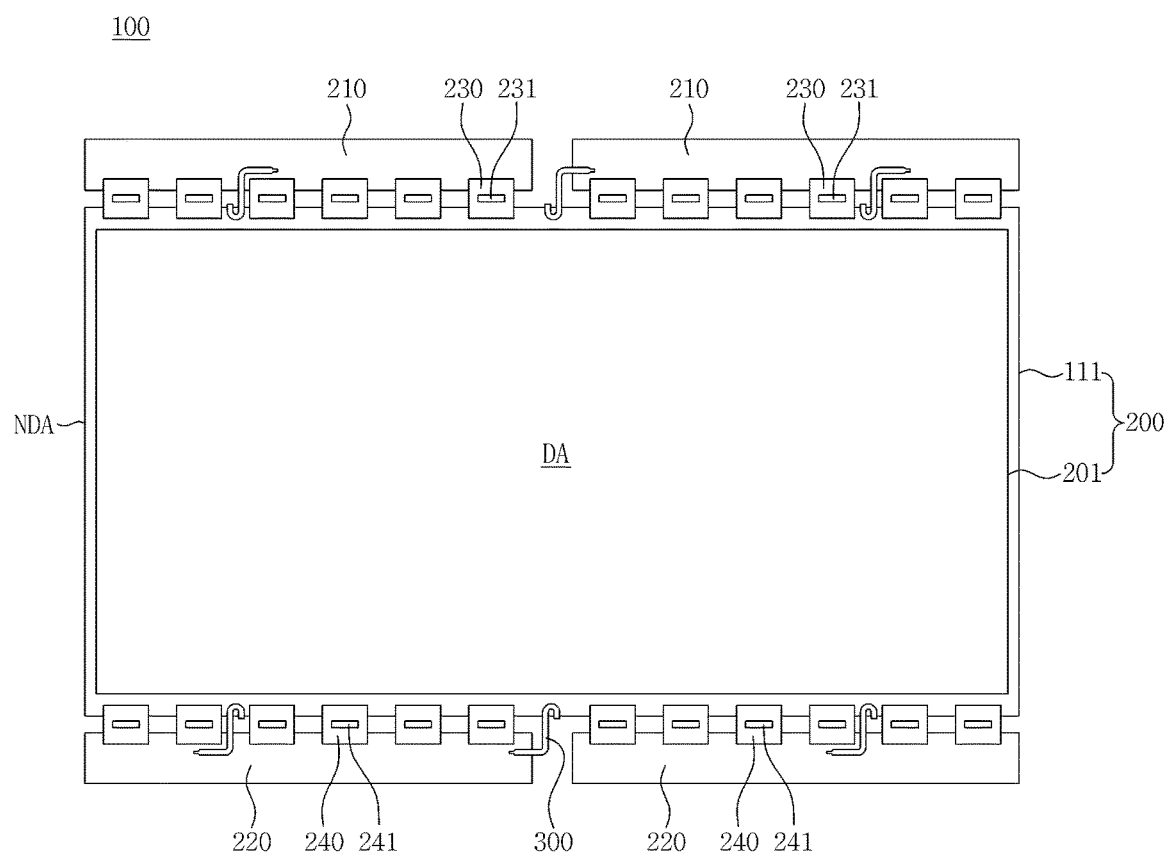
FIG. 1 is a schematic plan view illustrating a display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIGS. 1 to 7B illustrate a display device according to an exemplary embodiment of the present invention. Hereinafter, for ease of description, the display device is assumed to include an organic light emitting display.

Figure 2:
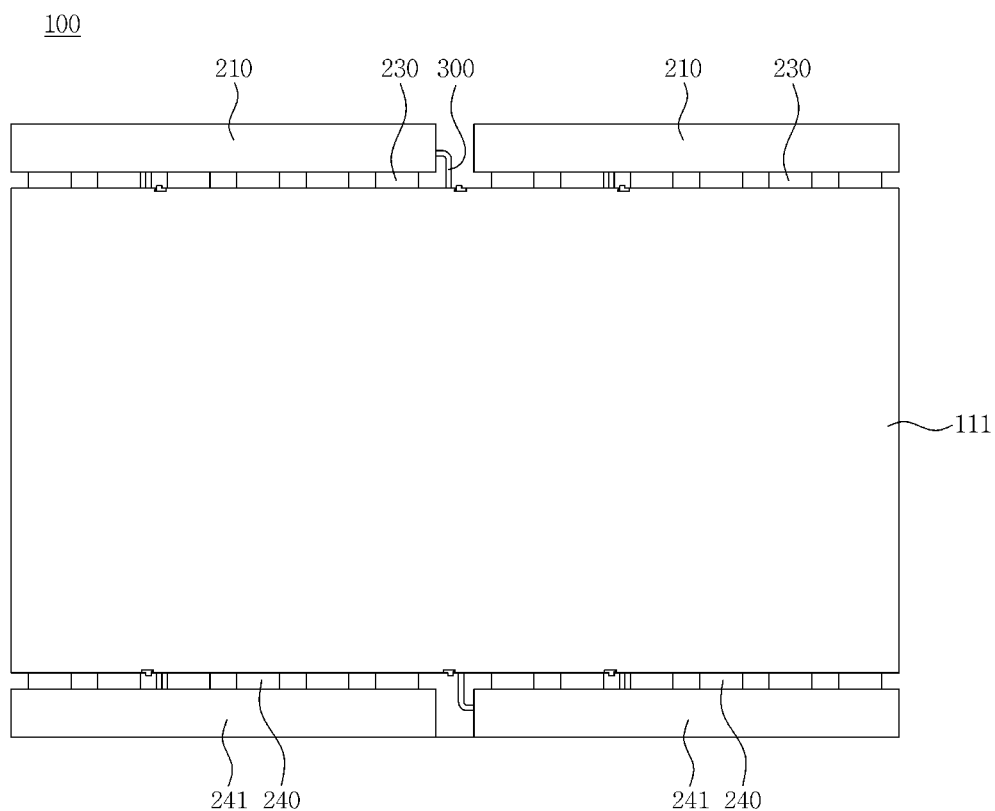
FIG. 2 is a schematic rear view illustrating the display device according to the exemplary embodiment of the present invention.
Figure 3:
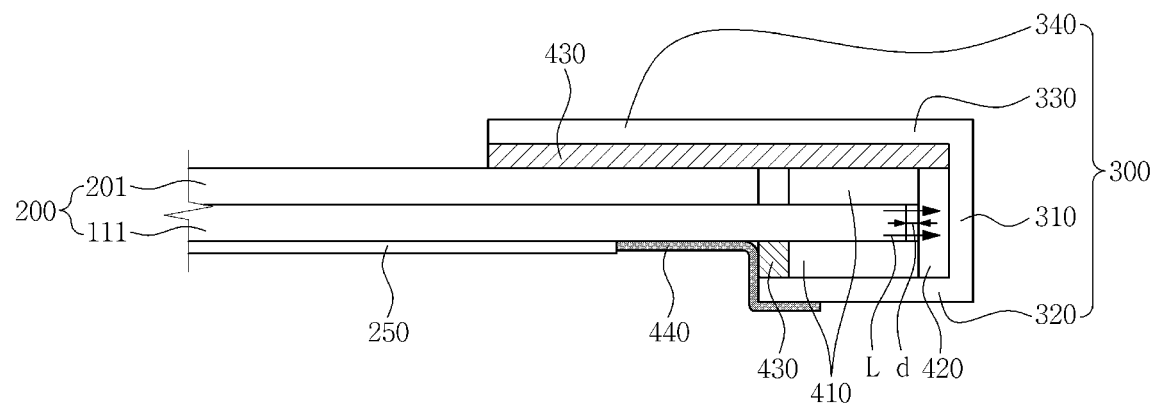
FIG. 3 is a schematic cross-sectional view illustrating the display device according to the exemplary embodiment of the present invention.
Figure 4:
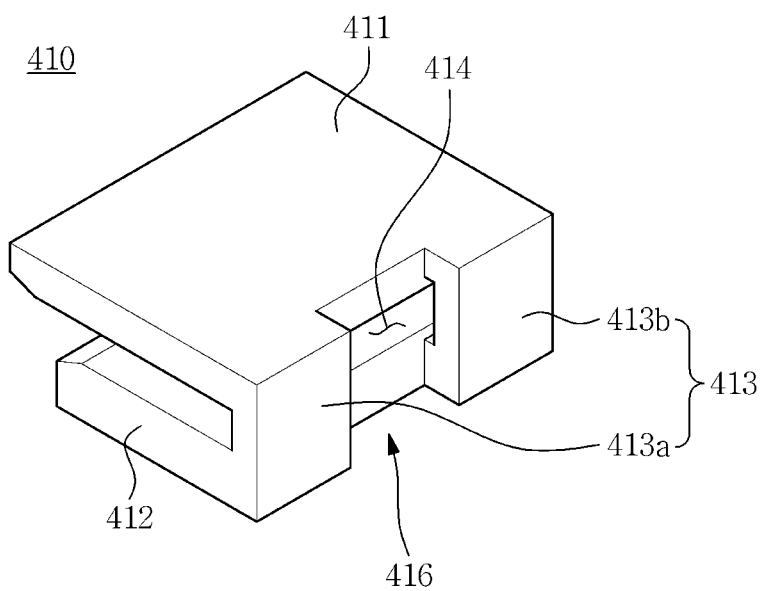
FIG. 4 is a schematic perspective view illustrating a fixing member illustrated in FIG. 3.
Figure 5:
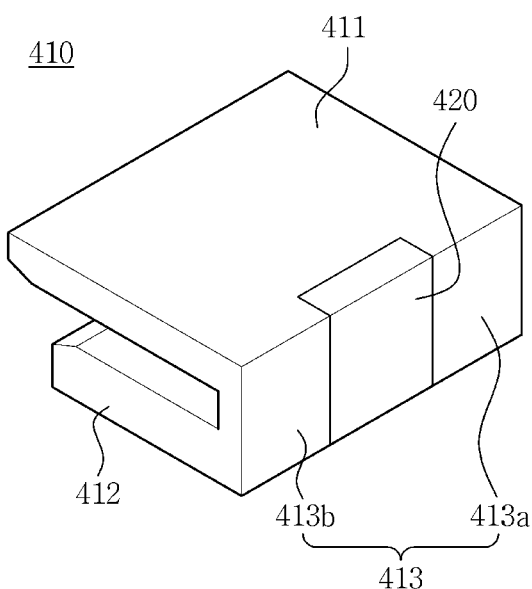
FIG. 5 is a schematic perspective view illustrating a fixing member having a photo sensor inserted thereto according to the exemplary embodiment of the present invention.
Figure 6A:
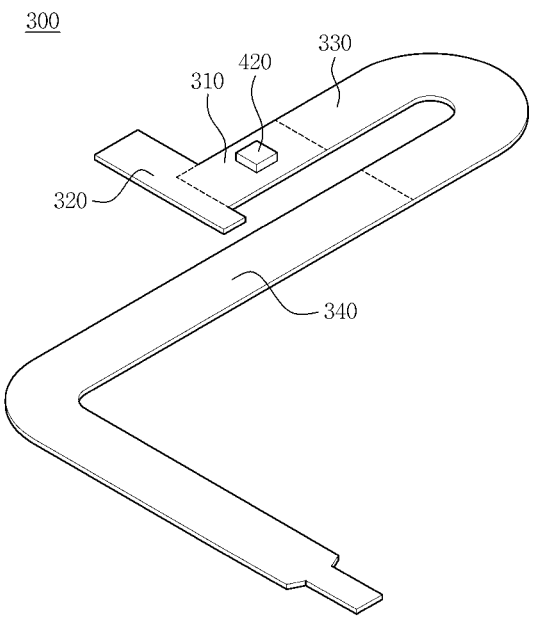
FIGS. 6A to 6C are schematic perspective views illustrating a method of attaching a fixing member to a connector according to the exemplary embodiment of the present invention.
Figure 6B:
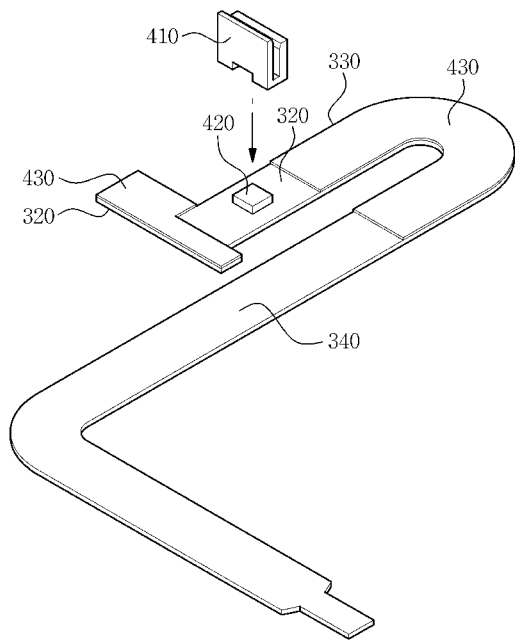
Figure 6C:
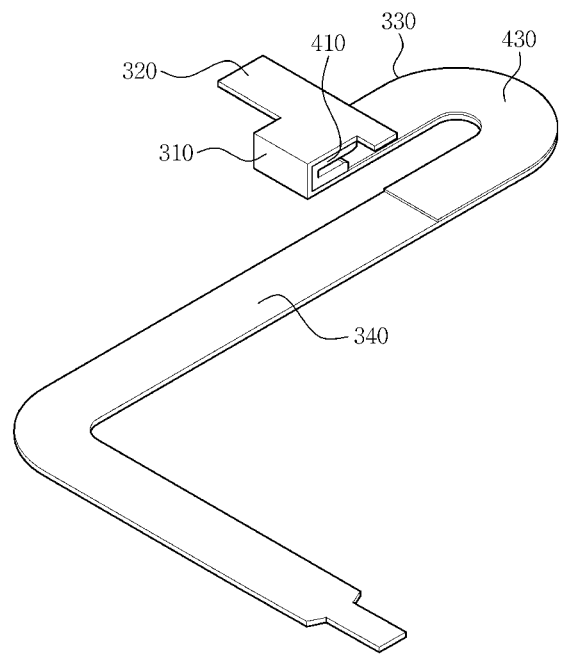
Figure 7A:
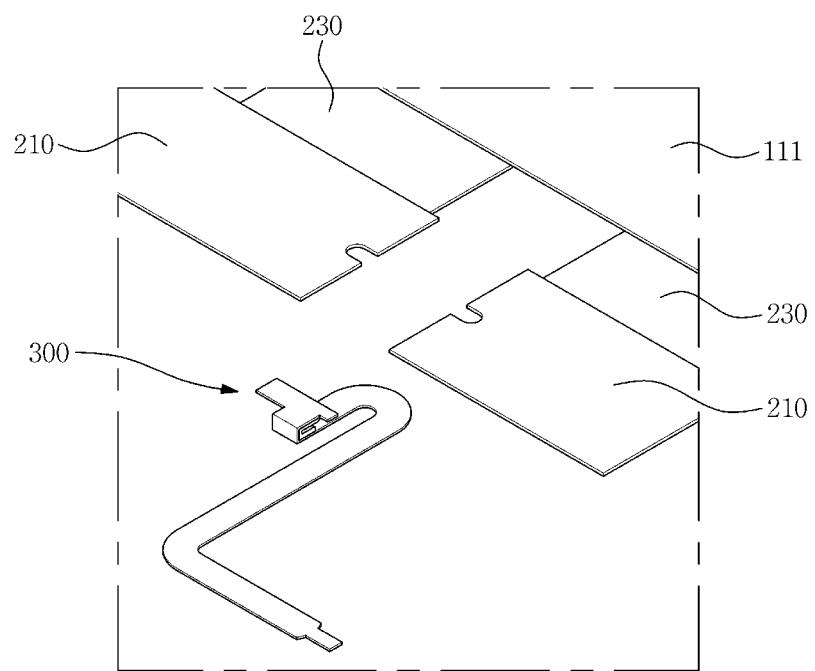
FIGS. 7A and 7B are schematic perspective views illustrating a method of attaching a connector and a fixing member to a display panel according to the exemplary embodiment of the present invention.
Figure 7B:
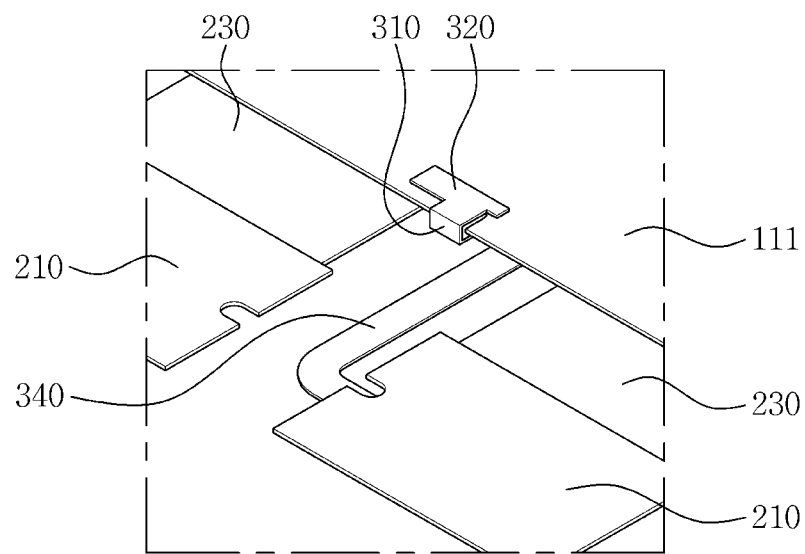

FIG. 1 is a schematic plan view illustrating a display device according to an exemplary embodiment of the present invention. FIG. 2 is a schematic rear view illustrating the display device according to the exemplary embodiment of the present invention. FIG. 3 is a schematic cross-sectional view illustrating the display device according to the exemplary embodiment of the present invention. FIG. 4 is a schematic perspective view illustrating a fixing member illustrated in FIG. 3. FIG. 5 is a schematic perspective view illustrating a fixing member having a photo sensor inserted thereto according to the exemplary embodiment of the present invention. FIGS. 6A to 6C are schematic perspective views illustrating a method of attaching a fixing member to a connector according to the exemplary embodiment of the present invention. FIGS. 7A and 7B are schematic perspective views illustrating a method of attaching a connector and a fixing member to a display panel according to the exemplary embodiment of the present invention.

Referring to FIGS. 1 to 3, an organic light emitting display device 100 according to an exemplary embodiment of the present invention may include a display panel 200, a polarizer 250, a connector 300, a fixing member 410, a photo sensor 420, a double-sided tape 430, and a light blocking tape 440.

The display panel 200 may display an image, and may be one of an LCD panel, an electrophoretic display panel, an organic light emitting diode (OLED) panel, an light emitting diode (LED) panel, an inorganic electro luminescent (EL) display panel, a field emission display (FED) panel, a surface-conduction electron-emitter display (SED) panel, a plasma display panel (PDP), and a cathode ray tube (CRT).

The display panel 200 may include a first substrate 111, a second substrate 201 opposed to the first substrate 111, a sealing member (not illustrated), and a polarizer 250. Alternatively, the first substrate 111 may be encapsulated by an encapsulation film, other than the second substrate 201.

When the display device is a top emission type, the first substrate 111 may include a display area DA for displaying an image by light emission, and a non-display area NDA disposed at an outline of the display area DA. Pixels may be formed on the display area DA of the first substrate 111 to display an image.

The non-display area NDA may include pad electrodes (not illustrated) that may receive and transmit an external signal to the OLED in order to emit light therefrom.

When a display device is a bottom emission type, the display area DA may be a rear surface of the first substrate 111, as illustrated in FIG. 2.

The first substrate 111 may be formed of transparent glass materials including silicon oxides SiO2. Alternatively, the first substrate 111 may be formed of transparent plastic materials.

The display panel 200 may include driving chips 231 and 241 configured to supply a driving signal, driving-chip mounting films 230 and 240 on which the driving chips 231 and 241 are mounted, and printed circuit boards (PCBs) 210 and 220 electrically connected to the display panel 200 through the driving-chip mounting films 230 and 240. The driving-chip mounting film may be a tape carrier package (TCP).

The PCBs 210 and 220 may be a circuit board configured to supply a driving signal to the display panel 200. The PCBs 210 and 220 may include a timing controller (not illustrated) configured to generate a control signal for driving the display panel 200 and a power voltage generator (not illustrated) configured to generate a power voltage.

The driving chips 231 and 241 may generate a driving signal for driving the display panel 200 in response to an external signal. The external signal is a signal supplied from the PCBs 210 and 220, and the external signal may include an image signal, control signals, a driving voltage, and the like.

The gate PCB 210 may be connected to the gate driving-chip mounting film 230. The gate PCB 210 may apply an image signal to the gate driving chip 231. The data PCB 220 may be connected to the data driving-chip mounting film 240. The data PCB 220 may apply an image signal to the data driving chip 241.

The gate driving chip 231 may receive an image signal and apply a gate driving signal to a gate line. The data driving chip 241 may receive an image signal and apply a data driving signal to a data line.

The polarizer 250 may be disposed on the display panel 200 and prevent ambient light reflection. For example, the polarizer 250 may be disposed on a rear surface of the first substrate 111.

The display panel 200 may include an OLED, a thin-film transistor, and wiring for driving the OLED on the display area DA. The OLED, the thin-film transistor, and wires for driving the OLED will be described below with reference to FIGS. 11 and 12.

The second substrate 201 may be disposed to face the first substrate 111 and bonded to the first substrate 111 by a sealing member (not illustrated). The second substrate 201 may be made of a glass substrate, a transparent synthetic resin film such as acrylic, and a metal plate. For example, the second substrate 201 may be formed of one of a polyethylene (PET) film, a polypropylene (PP) film, a polyamide (PA) film, a polyacetal (POM) film, a poly methyl methacrylate (PMMA) film, a polybutylene terephthalate (PBT) film, a polycarbonate (PC) film, a cellulose film, and moisture-proof cellophane.

The second substrate 201 may have a smaller size than the first substrate 111. Accordingly, the non-display area NDA of the first substrate 111 may be exposed by the second substrate 201. The sealing member may be a generally known material used for sealing purposes, such as a sealing glass frit.

Referring to FIGS. 3 and 6A to 6C, the photo sensor 420 may be disposed on the connector 300, and the connector 300 may be connected to the PCBs 210 and 220. The connector 300 may electrically connect the photo sensor 420 and the PCBs 210 and 220, thereby providing an electric connection between the photo sensor 420 and the PCBs 210 and 220. The connector 300 may be a flexible printed circuit board (FPCB).

The connector 300 may be attached on one surface of each of the first and second substrates 111 and 201 and cover at least a portion of side surfaces of the first and second substrates 111 and 201. One end portion of the connector 300 may be connected to the PCBs 210 and 220.

The connector 300 may include a photo-sensor mounting portion 310, a protrusion 320, a curved portion 330, and an extending portion 340. The photo sensor 420 may be disposed on the photo-sensor mounting portion 310. The protrusion 320 may be bent from the photo-sensor mounting portion 310 and attached to one surface of the first substrate 111. A double-sided tape 430 may be disposed between the protrusion 320 and the first substrate 111 to attach the protrusion 320 to the first substrate 111. The curved portion 330 may be bent from the photo-sensor mounting portion 310 and attached to one surface of the second substrate 201. A double sided tape 430 may be disposed between the curved portion 330 and the second substrate 201 to attach the curved portion 330 to the second substrate 201. The extending portion 340 may be connected to the curved portion 330, and one end portion of the extending portion 340 may be connected to the PCBs 210 and 220.

The connector 300 may have a various forms to mount the photo sensor 420 on a side surface of the first substrate 111 and to connect the photo sensor 420 to the PCBs 210 and 220.

Although not illustrated, the connector 300 may include a base film, a line pattern disposed on the base film, and a cover film disposed on the line pattern.

The base film and the cover film may include a film having high flexibility, insulating property, and heat-resistant property, such as polyimide.

The line pattern may be disposed between the base film and the cover film. The line pattern may be configured to transmit predetermined electric signals. The line pattern may be formed of a metal, such as copper (Cu), and plated with at least one of tin, silver, and nickel on a surface of the copper. A method of forming the line pattern may include casting, laminating, and electroplating.

The photo sensor 420 may disposed on the connector 300 to face a side surface of the first substrate 111. The photo sensor 420 may receive light emitted from the side surface of the first substrate 111. For example, the photo sensor 420 may measure light of a pixel disposed in the non-display area NDA of the first substrate 111, convert an analog value of the measured light into a digital value, and calculate a luminance value from collected digital values. The photo sensor 420 may be a small and low-priced element, such as a photo conductive cell CdS, a photo diode, a photo transistor, a photo thyristor, a charge coupled device (CCD), and a complementary metal oxide semiconductor (CMOS) image sensor.

The connector 300 may electrically connect the photo sensor 420 mounted on the connector 300 to the PCBs 210 and 220.

Referring to FIGS. 3, 4, and 5, a fixing member 410 may be disposed between the first substrate 111 and the connector 300, and the photo sensor 420 may be inserted thereto. At least a part of the first substrate 111 may be inserted into the fixing member 410 that contacts each of opposing surfaces of the first substrate 111. The fixing member 410 may be attached to the connector 300 and disposed between the driving-chip mounting films 230 and 240.

The fixing member 410 may have an aperture 414 that transmits light L emitted from the first substrate 1110. The photo sensor 420 may be inserted into the fixing member 410 facing the aperture 414 to receive the light L through the aperture 414.

More particularly, the fixing member 410 may include an upper portion 411, a lower portion 412, and a side wall portion 413. The upper portion 411 may be disposed on one surface of the first substrate 111. The lower portion 412 may be disposed to face the upper portion 411 and disposed on another surface of the first substrate 111. The side wall portion 413 may connect the upper and lower portions 411 and 412. The side wall portion 413 may include a right side-wall portion 413a and a left side-wall portion 413b. The side wall portion 413 may have an inserting groove 416 arranged between the right and left side-wall portions 413a and 413b. Therefore, the photo sensor 420 may be disposed on the inserting groove 416.

A light blocking tape 440 may be disposed on an edge portion of the light emission surface of the first substrate 111 to prevent light leakage. The light blocking tape 440 may contact with one end portion of the polarizer 250 and one end portion of the connector 300.

Referring to FIGS. 6A to 7B, the photo sensor 420 may be disposed at the connector 300, and the double-sided tape 430 may be disposed on the protrusion 320 and the curved portion 330 of the connector 300. The fixing member 410 may be attached to the connector 300 to allow the photo sensor 420 to be inserted thereto. Referring to FIG. 6C, the photo-sensor mounting portion 310 and the protrusion 320 of the connector 300 may be bent. The bent connector 300, as illustrated in FIGS. 7A and 7B, may be disposed between the driving-chip mounting films 230 and 240. More particularly, the fixing member 410 may be coupled to the first substrate 111, and the connector 300 may be attached to the upper and lower surfaces of the first substrate 111. One end portion of the connector 300 may be electrically connected to the PCBs 210 and 220. Therefore, the organic light emitting display 100 according to the present exemplary embodiment may have the photo sensor 420 fixed by the fixing member 410 to stably detect light emitted from the display panel 200, collect light emitted from the display panel 200 to measure luminance of the dummy pixel, and pixel deterioration may be compensated using the measured luminance.

The connector 300, the photo sensor 420, and the fixing member 410 may be disposed between the driving-chip mounting films 230 and 240. According to an exemplary embodiment of the present invention, the connector 300, the photo sensor 420, and the fixing member 410 may be formed in other areas according to a location of an area where light emitted from the first substrate 111 is incident, and connection with the PCBs 210 and 220.

According to an exemplary embodiment of the present invention, a number of the connector 300, the photo sensor 420, and the fixing member 410 may vary depending on a luminance value measured by the display panel 200.

FIGS. 8A, 8B, 9, and 10 illustrate a connecting relationship between the connector 300, the photo sensor 420, and the fixing member 410 according to an exemplary embodiment of the present invention. Substantially similar elements and operations illustrated with respect to FIGS. 1 to 7B will be omitted.

Figure 8A:
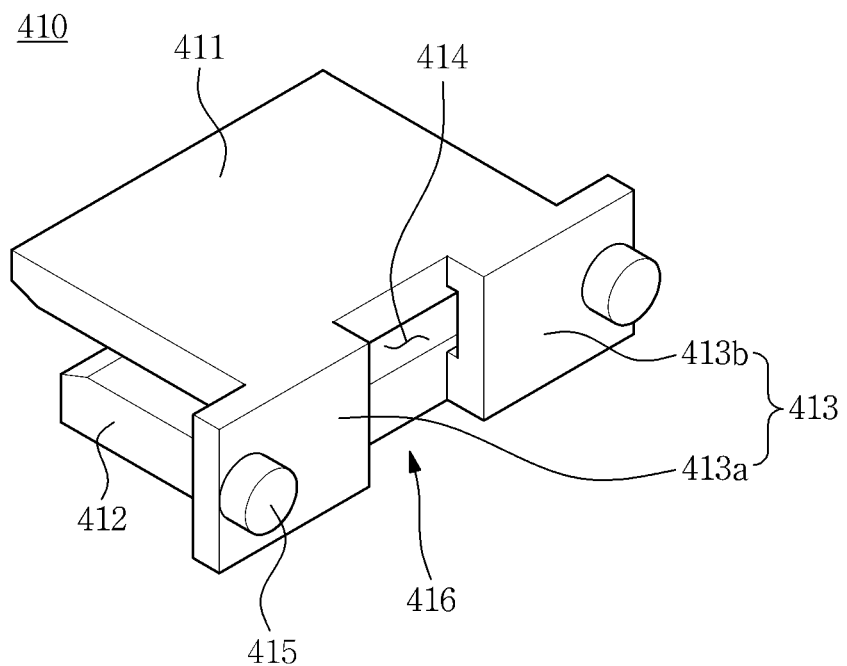
FIGS. 8A and 8B are perspective views illustrating a photo sensor and a connector according to an exemplary embodiment of the present invention.
Figure 8B:
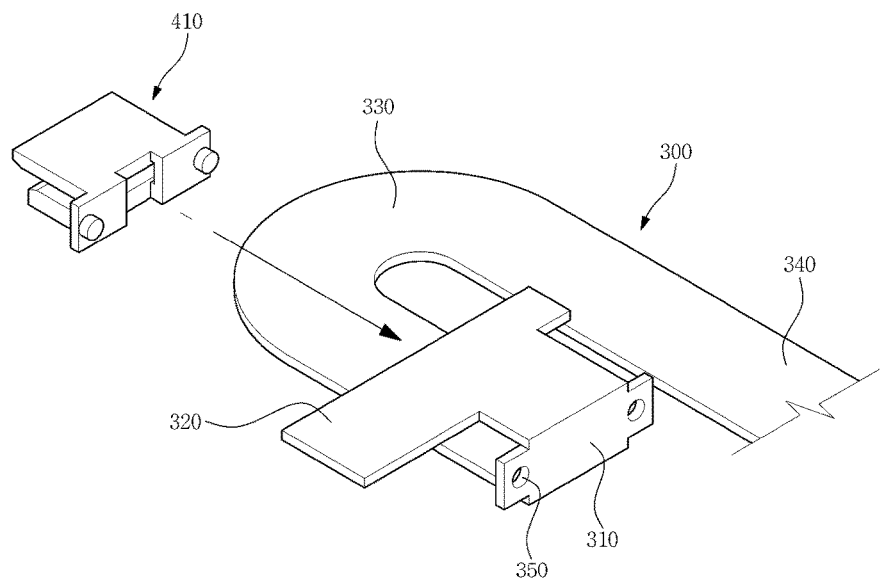
Figure 9:
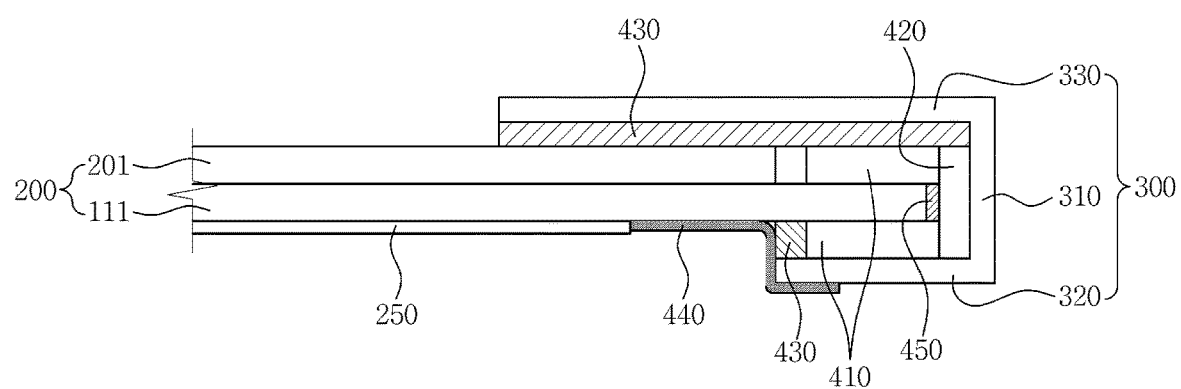
FIG. 9 is a schematic cross-sectional view illustrating a display device according to an exemplary embodiment of the present invention.
Figure 10:
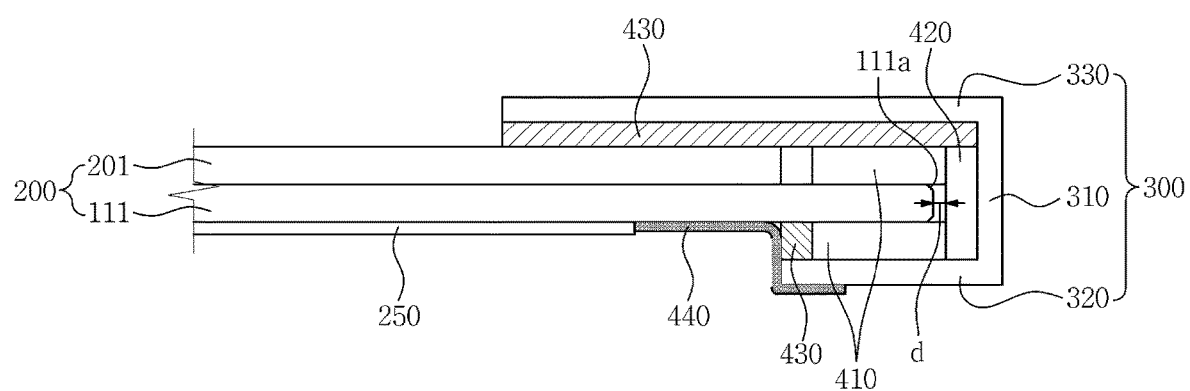
FIG. 10 is a schematic cross-sectional view illustrating a display device according to an exemplary embodiment of the present invention.

FIGS. 8A and 8B are perspective views illustrating a photo sensor and a connector according to an exemplary embodiment of the present invention. FIG. 9 is a schematic cross-sectional view illustrating a display device according to an exemplary embodiment of the present invention. FIG. 10 is a schematic cross-sectional view illustrating a display device according to an exemplary embodiment of the present invention.

Referring to FIGS. 8A and 8B, a fixing member 410 may further include a coupling protrusion 415 and a connector 300 that includes a coupling hole 350. More particularly, the coupling protrusion 415 protrudes from a side wall portion 413 of the fixing member 410, and the coupling protrusion 415 may be inserted into the coupling hole 350. As the coupling protrusion 415 is inserted into the coupling hole 350, the fixing member 410 may be stably fixed to the photo-sensor mounting portion 310.

Referring to FIG. 9, a display device according to an exemplary embodiment of the present invention may further include an optical film 450 disposed between an optical sensor 420 and a fixing member 410. The optical film 450 may fill a gap "d" illustrated in FIG. 3 and collect light emitted from the first substrate 111. Accordingly, disposing the optical film 450 may increase light inputted to the optical sensor 420. The optical film 450 may be, for example, an optical clear adhesive (OCA).

Referring to FIG. 10, a display device according to an exemplary embodiment of the present invention may have a first substrate 111 with one end portion chamfered. The chamfer portion 111a of the first substrate 111 may prevent causing damage to the first substrate 111 during inserting the first substrate 111 into a fixing member 410.

Figure 11:
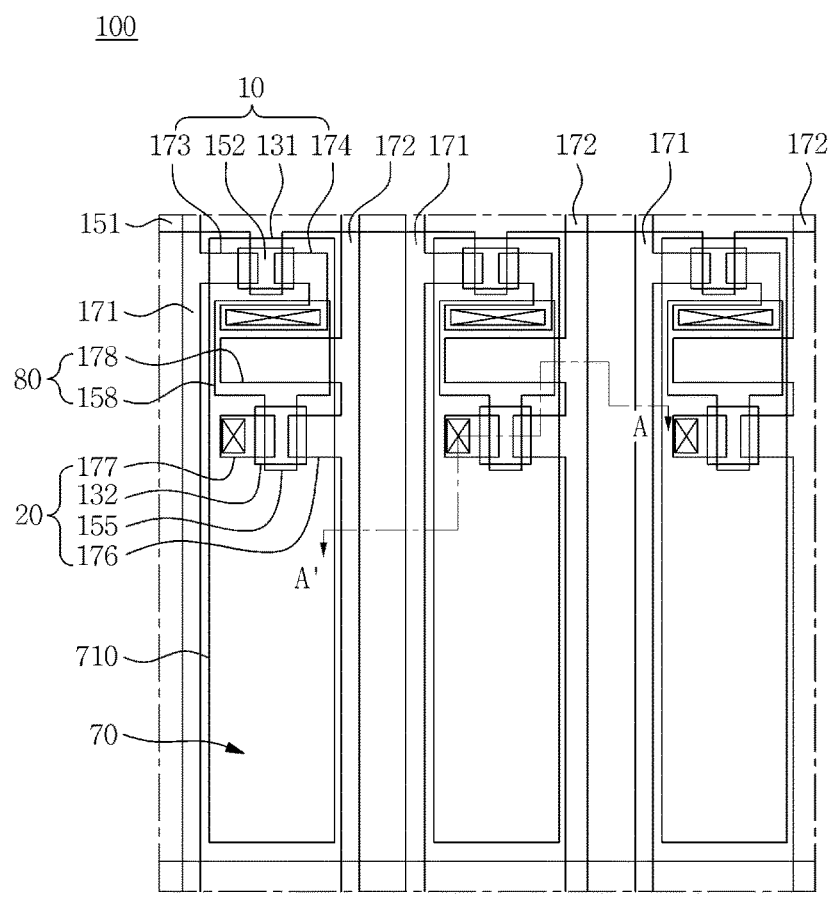
FIG. 11 is a schematic plan view illustrating a pixel of the display device illustrated in FIG. 1.
Figure 12:
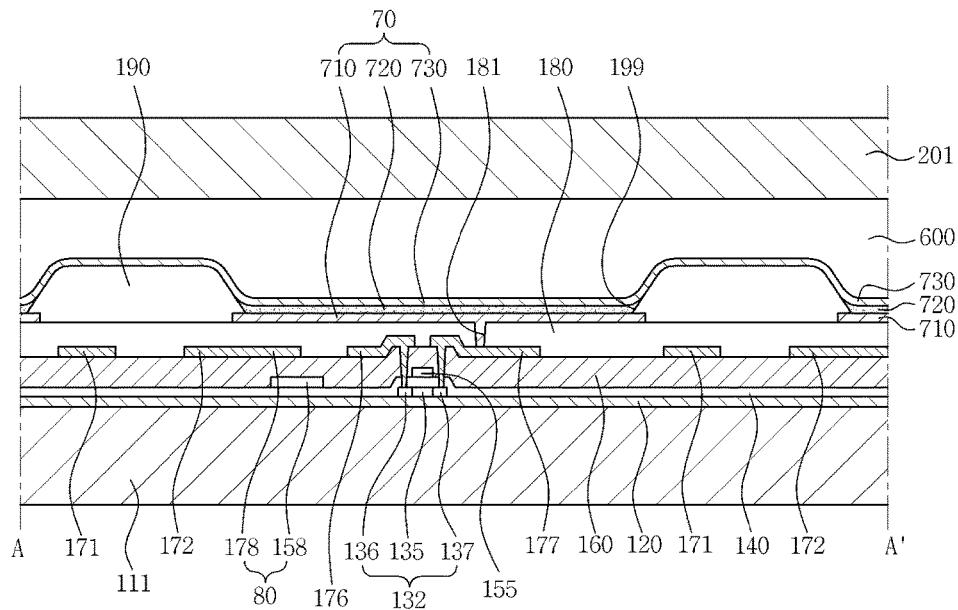
FIG. 12 is a cross-sectional view taken along line A-A' of FIG. 11.

FIGS. 11 and 12 illustrate a pixel of the display panel 200 that may be applied to the exemplary embodiments of the present invention.

FIG. 11 is a schematic plan view illustrating a pixel of the display device illustrated in FIG. 1. FIG. 12 is a cross-sectional view taken along line A-A' of FIG. 11.

A display area DA according to an exemplary embodiment of the present invention will be described below with reference to FIGS. 11 and 12.

The organic light emitting display according to the present exemplary embodiment illustrated in FIGS. 11 and 12 may be an active-matrix (AM) type that includes two thin-film transistors (TFTs) 10 and 20 and a capacitor 80 (2TR-1Cap structure) in each pixel of the display area (hereinafter DA of FIG. 1).

According to an exemplary embodiment of the present invention, the organic light emitting display 100 may have different structures including three or more TFTs, and two or more capacitors 80 in one pixel, and may further include additional lines. Hereinafter, the term "pixel" may refer to the smallest unit for displaying an image, and the display area DA may display an image using the pixels.

The organic light emitting display 100 according to an exemplary embodiment of the present invention may include a first substrate 111 and pixels arranged on the first substrate 111. Each pixel may include a switching TFT 10, a driving TFT 20, a capacitor 80, and an OLED 70. The first substrate 111 may further include a gate line 151 arranged along one direction, a data line 171, and a common power line 172 insulated from and intersecting a gate line 151.

Each pixel may be defined by the gate, data, and common power lines 151, 171, and 172.

The OLED 70 may include a first electrode 710, an organic light emitting layer 720 formed on the first electrode 710, and a second electrode 730 formed on the organic light emitting layer 720. One or more first electrodes 710 may be formed on each pixel, and thus the first substrate 111 may include first electrodes 710 spaced apart from each other.

The first electrode 710 may be a positive end portion (anode) serving as a hole injecting electrode, and the second electrode 730 may be a negative end portion (cathode) serving as an electron injecting electrode. Alternatively, the first electrode 710 may function as a cathode, and the second electrode 730 may function as an anode depending on a method of driving the organic light emitting display. Further, the first electrode 710 may be a pixel electrode and the second electrode 730 may be a common electrode.

A hole and an electron injected to the organic light emitting layer 720 may combine with each other to form an exciton, and the organic light emitting display may emit light by energy generated when the exciton falls from an excited state to a ground state.

The capacitor 80 may include a pair of storage electrodes 158 and 178 with an insulating layer 160 interposed therebetween. The insulating layer 160 may be a dielectric material. Capacitance of the capacitor 80 may be determined by electric charges stored in the capacitor 80 and voltage across the pair of storage electrodes 158 and 178.

The switching TFT 10 may include a switching semiconductor layer 131, a switching gate electrode 152, a switching source electrode 173, and a switching drain electrode 174. The driving TFT 20 may include a driving semiconductor layer 132, a driving gate electrode 155, a driving source electrode 176, and a driving drain electrode 177.

The switching TFT 10 may function as a switching element that is configured to select a pixel to perform light emission. The switching gate electrode 152 is connected to the gate line 151, and the switching source electrode 173 is connected to the data line 171. The switching drain electrode 174 may be spaced apart from the switching source electrode 173 and connected to the first storage electrode 158.

The driving TFT 20 may apply a driving power to the first electrode 710, which allows the light emitting layer 720 of the OLED 70 in a selected pixel to emit light. The driving gate electrode 155 may be connected to the first storage electrode 158 that is connected to the switching drain electrode 174. The driving source electrode 176 and the second storage electrode 178 may be respectively connected to the common power line 172.

The driving drain electrode 177 may be connected to the first electrode 710 of the OLED 70 through a drain contact hole 181.

The switching TFT 10 may be operated by a gate voltage applied to the gate line 151 and transmit a data voltage applied to the data line 171 to the driving TFT 20.

Voltage equivalent to a difference between a common voltage applied from the common power line 172 to the driving TFT 20 and the data voltage transmitted from the switching TFT 10 may be stored in the capacitor 80, and current corresponding to the voltage stored in the capacitor 80 may flow to the OLED 70 through the driving TFT 20, so that the OLED 70 emits light.

A structure of the organic light emitting display 100 including the OLED 70, the driving TFT 20, the capacitor 80, the data line 171, and the common power line 172 according to an exemplary embodiment of the present invention will be described in more detail with reference to FIG. 12.

A switching semiconductor layer 131, a switching gate electrode 152, switching source and drain electrodes 173 and 174 of the switching TFT 10 may have the substantially similar laminated structure as the driving semiconductor layer 132, the driving gate electrode 155, the driving source and drain electrodes 176 and 177 of the driving TFT 20, and thus the repeated description of the substantially similar elements will be omitted.

According to an exemplary embodiment of the present invention, the first substrate 111 may be made of an insulating substrate formed of glass, quartz, ceramic, plastic and the like. Alternatively, the first substrate 111 may be made of a metal substrate formed of stainless steel and the like.

A buffer layer 120 may formed on the first substrate 111. The buffer layer 120 may reduce or prevent infiltration of undesirable elements and planarize a surface, and may include various materials in accordance therewith. For instance, the buffer layer 120 may be made of at least one of a silicon nitride (SiNx), a silicon oxide (SiO2), and a silicon oxynitride (SiOxNy). However, the buffer layer 120 may not be always necessary and may be omitted according to the kind of the first substrate 111 and process conditions thereof.

The driving semiconductor layer 132 may be formed on the buffer layer 120. The driving semiconductor layer 132 may include at least one semiconductor material selected from a polycrystalline silicon, amorphous silicon, and oxide semiconductors. Further, the driving semiconductor layer 132 may include a channel region 135 that is not doped with impurities, and p+ doped source and drain regions 136 and 137 that are formed on opposing sides of the channel region 135. In this case, p-type impurities, such as boron B, may be used as dopant ions and $B_2H_6$ may be used. Such impurities may vary depending on the kinds of the TFTs.

A gate insulating layer 140 formed of a silicon nitride or a silicon oxide may be formed on the driving semiconductor layer 132. The gate insulating layer 140 may include at least one of tetraethyl orthosilicate (TEOS), a silicon nitride (SiNx), and a silicon oxide (SiO2). According to an exemplary embodiment of the present invention, the gate insulating layer 140 may have a double-layer structure where a SiNx layer having a thickness of 40 nm and a TEOS layer having a thickness of 80 nm are sequentially laminated.

The driving gate electrode 155, the gate line (refer to reference numeral 151 of FIG. 1), and the first storage electrode 158 may be formed on the gate insulating layer 140. In this case, the driving gate electrode 155 may be formed to overlap at least a part of the driving semiconductor layer 132, in more detail, the channel region 135. The driving gate electrode 155 may prevent the channel region 135 from being doped with impurities when the source and drain regions 136 and 137 of the driving semiconductor layer 132 are doped with the impurities in the forming of the driving semiconductor layer 132.

The gate electrode 155 and the first storage electrode 158 may be disposed on the same layer, and may be made of substantially the same metal material. In this case, the metal material may include at least one of molybdenum (Mo), chromium (Cr), and tungsten (W). According to an exemplary embodiment of the present invention, the gate electrode 155 and the first storage electrode 158 may be made of molybdenum (Mo) or molybdenum alloys.

The insulating layer 160 configured to cover the driving gate electrode 155 may be formed on the gate insulating layer 140. The insulating layer 160 may be an interlayer insulating layer. The insulating layer 160 may be made of a silicon nitride (SiNx) or a silicon oxide (SiOx). The gate insulating layer 140 and the insulating layer 160 may have a contact hole to expose the source and drain regions 136 and 137 of the driving semiconductor layer 132.

The driving source and drain electrodes 176 and 177, the data line 171, the common power line 172, the second storage electrode 178 may be disposed on the insulating layer 160 of the display area DA. The driving source and drain electrodes 176 and 177 may be respectively connected to the source and drain regions 136 and 137 of the driving semiconductor layer 132 through the contact hole.

In more detail, the driving source and drain electrodes 176 and 177, the data line 171, the common power line 172, and the second storage electrode 178 may be formed of refractory metal formed of at least one of molybdenum, chromium, tantalum, titanium, and alloys thereof, and may have a multi-layer structure including a refractory metal film and a low-resistance conductive film. Examples of the multi-layer structure may include a double-layer structure including a chromium or molybdenum (alloy) lower film and an aluminum (alloy) upper film, and a triple-layer structure including a molybdenum (alloy) lower film, an aluminum (alloy) middle film, and a molybdenum (alloy) upper film.

The driving source and drain electrodes 176 and 177, the data line 171, the common power line 172, and the second storage electrode 178 may be formed of various conductive materials other than the above-described materials.

Accordingly, the driving TFT 20 may be formed including the driving semiconductor layer 132, the driving gate electrode 155, and the driving source and drain electrodes 176 and 177. However, the configurations of the driving thin film transistor 20 may be modified to have many different structures.

A protective layer 180 may be formed on the insulating layer 160 to cover the driving source and drain electrodes 176 and 177, and the like. The protective layer 180 may be made of organic materials, such as polyacrylates and polyimides. The protective layer 180 may be a planarizing layer.

The protective layer 180 may be formed of at least one of polyacrylate resins, epoxy resins, phenolic resins, polyamide resins, polyimide reins, unsaturated polyester resins, polyphenylenether resins, poly-phenylenesulfide resins, and benzocyclobutene (BCB).

The protective layer 180 may have the drain contact hole 181 to expose the driving drain electrode 177.

The first electrode 710 may be formed on the protective layer 180 and connected to the driving drain electrode 177 through the drain contact hole 181 of the protective layer 180.

A pixel defining layer 190 may be formed on the protective layer 180 and cover the first electrode 710. The pixel defining layer 190 may have an aperture 199 to expose the first electrode 710.

More particularly, the first electrode 710 may be disposed to correspond to the aperture 199 of the pixel defining layer 190. The pixel defining layer 190 may include resins, such as polyacrylate resins and polyimide resins.

Further, the pixel defining layer 190 may include a photosensitive organic material or a photosensitive polymer material. For example, the pixel defining layer 190 may be made of one of polyacrylates, polyimides, photo sensitive polyimides (PSPI), photosensitive acryl (PA), and photosensitive novolak resins.

The organic light emitting layer 720 may be formed on the first electrode 710 in the aperture 199 of the pixel defining layer 190, and the second electrode 730 may be formed on the pixel defining layer 190 and the organic light emitting layer 720.

Accordingly, the OLED 70 may be formed including the first electrode 710, the organic light emitting layer 720, and the second electrode 730.

One of the first and second electrodes 710 and 730 may be formed of a transparent conductive material and the other one thereof may be formed of a transflective or reflective conductive material. Whether the organic light emitting display device 100 is a top-emission type, a bottom-emission type, or a both-side-emission type may depend on a material forming the first and second electrodes 710 and 730.

For example, when the organic light emitting display 100 according to an exemplary embodiment of the present invention is the top-emission type, the first electrode 710 may be formed of the transflective or reflective conductive material and the second electrode 730 may be formed of the transparent conductive material.

At least one substance selected from tin oxides (ITO), indium zinc oxides (IZO), zinc oxides (ZnO), and indium oxides ($In_2O_3$) may be used as the transparent conductive material. At least one of lithium (Li), calcium (Ca), lithium fluoride/calcium (LiF/Ca), lithium fluoride/aluminum (LiF/Al), aluminum (Al), silver (Ag), magnesium (Mg), and gold (Au) may be used as the reflective material.

The organic light emitting layer 720 may be made of low molecular weight organic materials or high molecular weight organic materials. The organic light emitting layer 720 may have a multi-layer structure including a light emitting layer and at least one of a hole injection layer (HIL), a hole transporting layer (HTL), an electron transporting layer (ETL) and an electron injection layer (EIL). Alternatively, the HIL may be disposed on the first electrode 710 that is a positive end portion, and the HTL, light emitting layer, ETL, and EIL may be sequentially laminated thereon.

According to an exemplary embodiment of the present invention, the organic light emitting layer 720 may be formed only inside the aperture 199 of the pixel defining layer 190. Alternatively, at least one layer of the organic light emitting layer 720 may be disposed not only on the first electrode 710, but also between the pixel defining layer 190 and the second electrode 730 inside the aperture 199 of the pixel defining layer 190. In more detail, HIL, HTL, ETL, EIL, and the like of the organic light emitting layer 720 may be formed on an area other than the aperture 199 of the pixel defining layer 190 by an open mask, and the light emitting layer of the organic light emitting layer 720 may be formed on each aperture 199 of the pixel defining layer by a fine metal mask (FMM).

Meanwhile, when an LCD display is used as a display device, the first electrode 710 may be physically and electrically connected to the driving drain electrode 177 through the drain contact hole 181 and applied with a data voltage from the driving drain electrode 177. The first electrode 710 applied with the data voltage may form an electric field with a second electrode (common electrode, not illustrated) applied with a common voltage, which may determine a direction of the liquid crystal molecules of the liquid crystal layer (not illustrated) between the two electrodes. The first electrode 710 and the second electrode may form a capacitor (hereinafter "a liquid crystal capacitor"), which may maintain an applied voltage although the TFT is turned off.

The second substrate 201 may be bonded to the first substrate 111 to seal the OLED 70 interposed therebetween. The second substrate 201 may cover and protect the TFTs 10 and 20 and the OLED 70 formed on the first substrate 111 to be sealed from outside. An insulating substrate generally formed of glass or plastic may be used as the second substrate 201. When the organic light emitting display 100 is provided in the top-emission type where an image is displayed toward the second substrate 201, the second substrate 201 may be formed of a light-transmissive material.

A buffer member 600 may be disposed between the first and second substrates 111 and 201. The buffer member 600 may protect inner elements such as the OLED 70 from external shock applied to the organic light emitting display 100. The buffer member 600 may improve device reliability of the organic light emitting display 100. The buffer member 600 may include at least one of an organic sealant, such as urethane-based resin, an epoxy-based resin, and an acrylic resin, or an inorganic sealant, such as silicon. An urethane acrylate, for example, may be used as the urethane-based resin. A butyl acrylate and an ethylhexyl acrylate, for example, may be used as the acrylic resin.

Hereinafter, a method of compensating for pixel deterioration using a luminance value sensed by the photo sensor 420 will be described with reference to FIGS. 13 to 15. Hereinafter, a dummy pixel refers to a pixel disposed on the non-display area NDA illustrated in FIG. 1.

Figure 13:
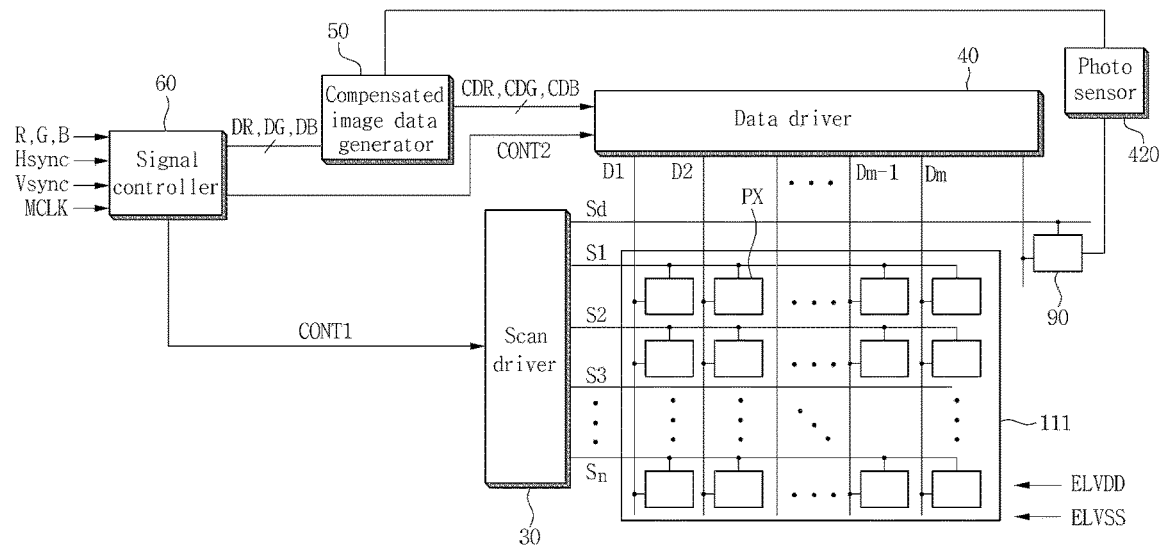
FIG. 13 is a schematic block diagram illustrating the display device illustrated in FIG. 1.

FIG. 13 is a schematic block diagram illustrating a display device illustrated in FIG. 1. FIG. 14 is an equivalent circuit diagram illustrating a dummy pixel illustrated in FIG. 13. FIG. 15 is a detailed block diagram illustrating a compensated image data generator illustrated in FIG. 13.

Referring to FIG. 13, a display device according to an exemplary embodiment of the present invention may include the display area DA, a dummy pixel 90, a scan driver 30, a data driver 40, a signal controller 60, a compensated image data generator 50, and the photo sensor 420. The display area DA includes signal lines S1~Sn and D1~Dm and pixels PX substantially arranged in a matrix form and connected to the signal lines, when viewed in an equivalent circuit.

The signal lines S1~Sn and D1~Dm may include scan lines S1~Sn configured to apply scan signals and data lines D1~Dm configured to apply data voltages. The scan lines S1~Sn may extend in a row direction and be substantially parallel to each other, and the data lines D1~Dm may extend in a column direction to be substantially parallel to each other.

A dummy pixel 90 according to an exemplary embodiment of the present invention may be connected to a dummy scan line Sd and a dummy data line Dd. The dummy pixel 90 may be formed on an outline of the display area DA when forming the pixels PX of the display area DA, and may have substantially similar properties as the pixels PX of the display area DA. The outline of the display area DA may be the non-display area NDA illustrated in FIG. 1. Thus, the dummy pixel 90 may refer to pixels disposed on the non-display area NDA.

Figure 14:
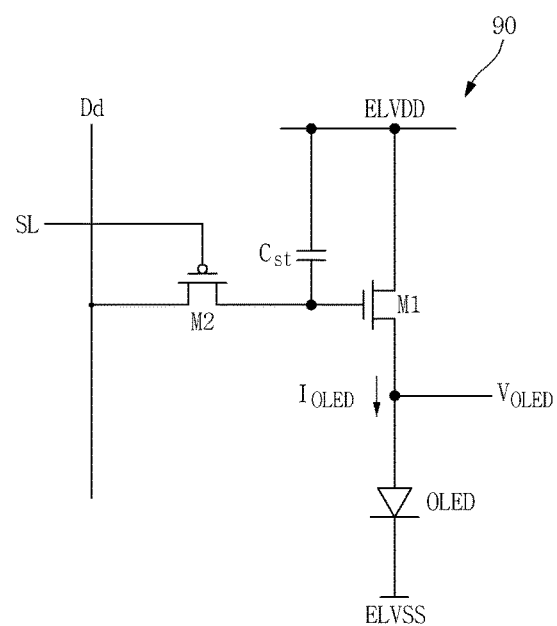
FIG. 14 is an equivalent circuit diagram illustrating a dummy pixel illustrated in FIG. 13.

Referring to FIG. 14, the dummy pixel 90 may include an organic light emitting element (e.g., an organic light emitting diode (OLED)), a driving transistor M1, a capacitor Cst, and a switching transistor M2.

The driving transistor M1 may receive a first driving voltage ELVDD from a source terminal and a drain terminal is connected to an anode terminal of the organic light emitting element. A gate terminal of the driving transistor M1 is connected to a drain terminal of the switching transistor M2. The driving transistor M1 may apply a driving current IOLED, an amount of which may vary according to voltage across the gate and drain terminals.

The gate terminal of the switching transistor M2 is connected to the dummy scan line Sd and the source terminal is connected to the dummy data line Dd. The switching transistor M2 may drive as a switch in response to the scan signal applied to the dummy scan signal Sd. A data signal (i.e., a data voltage) applied to the dummy data line Dd may be transmitted to the gate terminal of the driving transistor M1 when the switching transistor M2 is turned on.

The capacitor Cst is connected between the source and gate terminals of the driving transistor M1. The capacitor Cst may store a data voltage applied to the gate terminal of the driving transistor M1 and maintain the data voltage after the switching transistor M2 is turned off.

The organic light emitting element may be realized by an OLED. The OLED may receive a second driving voltage ELVSS through a cathode terminal. The OLED may emit light with light intensity that varies according to the driving current IOLED applied by the driving transistor M1. A resistance of the OLED may increase over time of driving the OLED that may deteriorate the OLED, and an amount of light emission corresponding to a current may reduce depending on the deterioration degree.

Luminance may be a factor for representing an amount of light emission of the OLED. A resistance of the OLED may increase in accordance with deterioration degree of the OLED, which may reduce luminance for the same amount of current applied thereto.

In the organic light emitting display according to an exemplary embodiment of the present invention, the deterioration degree of the OLED according to a driving time may be measured using the luminance value of the dummy pixel 90 measured by the photo sensor 420. In an analog driving method, the organic light emitting display may compensate for an amount of the driving current IOLED flowing through the OLED corresponding to image data DR, DG, and DB by the deterioration degree.

In a digital driving method, the organic light emitting display may increase duration of light emission time of the OLED corresponding to image data DR, DG, and DB according to the deterioration degree. Accordingly, the organic light emitting display may compensate for luminance reduction caused by deterioration of the OLED. The organic light emitting display according to an exemplary embodiment of the present invention may use image data DR, DG, and DB corresponding to each pixel PX to determine a deterioration degree of the OLED of the respective pixels PXs. The use of the image data DR, DG, and DB will be described in more detail below with reference to FIG. 15.

Meanwhile, the driving and switching transistors M1 and M2 are described as a p-channel field effect transistor (FET) in FIG. 14, but are not limited thereto. According to an exemplary embodiment of the present invention, at least one of the driving and switching transistors M1 and M2 may be an n-channel FET. Further, a connecting relationship of the driving and switching transistors M1 and M2, and the capacitor Cst, and the OLED may be modified. The dummy pixel 90 illustrated in FIG. 14 is described as an example of one pixel of the display device. Alternatively, a pixel of a different structure including at least two transistors and at least one capacitor may be used. Further, a configuration of the pixel PX illustrated in FIG. 13 may be substantially the same as that of the dummy pixel 90 illustrated in FIG. 14, and thus repeated description of the substantially similar configuration will be omitted.

Referring back to FIG. 13, the scan driver 30 is connected to the scan lines S1~Sn of the display area DA and may sequentially apply scan signals to the scan lines S1~Sn in response to the scan control signal CONT1. The scan signal may include a gate-on voltage Von that may turn on the switching transistor M2 and a gate-off voltage Voff that may turn off the switching transistor M2. When the switching transistor M2 is a p-channel FET, the gate-on voltage and the gate-off voltage may respectively be low and high voltages.

Further, the scan driver 30 according to an exemplary embodiment of the present invention is connected to the dummy scan line Sd and may apply the dummy scan signals to the dummy scan lines Sd. In this case, the dummy scan signals applied to the dummy scan lines Sd may maintain a gate-on voltage Von level.

The data driver 40 may be connected to the data lines D1~Dm of the display area DA. The data driver 40 may convert compensated image data CDR, CDG, and CDB inputted from the signal controller 60 into a data voltage, and apply the data voltage to the data lines D1~Dm, according to the data control signal CONT2. The data driver 40 according to an exemplary embodiment of the present invention may operate in the digital driving method. More particularly, the data driver 40 may adjust a pulse width of the data voltage to express a gray level of the compensated image data CDR, CDG, and CDB. Further, the data driver 40 is connected to the dummy data line Dd of the dummy pixel 90, and may apply a dummy data voltage having a pulse width corresponding to a full white gray level.

The signal controller 60 may externally receive input signals R, G, and B, horizontal synchronization signals Hsync, vertical synchronization signals Vsync, and main clock signals MCLK. The signal controller 60 may produce scan control signals CONT1, data control signals CONT2, and image data DR, DG, and DB. The scan control signal CONT1 may include scan start signals STV instructing start of scanning and at least one clock signal controlling an output period of the gate-on voltage Von. The scan control signal CONT1 may further include output enable signals OE that may limit duration of the gate-on voltage Von.

The data control signal CONT2 may include a horizontal synchronization start signal STH that reports the start of transmission of the compensated image data signals CDR, CDG, and CDB corresponding to the pixels PX of one row to the data driver 40, and a load signal LOAD that instructs transmission of data voltages to the data lines D1~Dm.

The photo sensor 420 may receive light emitted from the dummy pixel 90 and convert the light to a digital value. The photo sensor 420 may calculate the converted digital value and yield a luminance value of the dummy pixel 90. The photo sensor 420 may transmit the luminance value to the compensated image data generator 50.

Hereinafter, an OLED disposed on the dummy pixel 90 may be referred as a first OLED, and an OLED disposed on the pixels PX may be referred as a second OLED.

The compensated image data generator 50 may calculate a first compensation amount according to an accumulated light emission time of the first OLED using the measured luminance value and the accumulated light emission time of the dummy pixel 90, determine a second compensation amount according to an accumulated light emission time of the respective second OLEDs of the pixels PX, and compensate for image data DR, DG, and DB respectively corresponding to the second OLEDs of the pixels PXs according to the second compensation amount. The image data signal DR, DG, and DB compensated by the compensated image data generator 50 may be referred as compensated image data CDR, CDG, and CDB.

When an accumulated light emission time elapses by a compensation unit time, the compensated image data generator 50 according to an exemplary embodiment of the present invention may determine a compensation amount corresponding to each time point.

Figure 15:
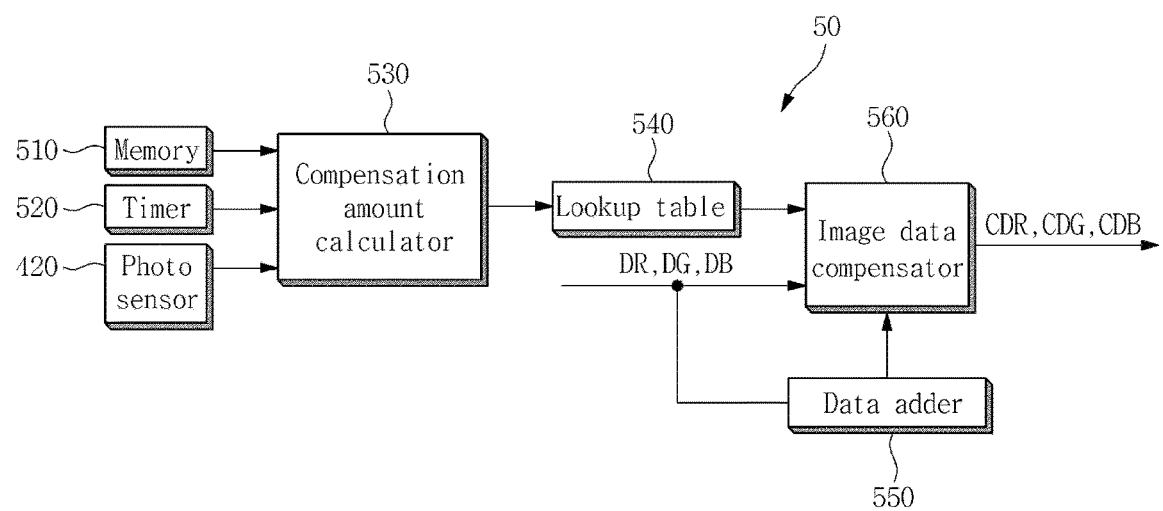
FIG. 15 is a detailed block diagram illustrating a compensated image data generator illustrated in FIG. 13.

Referring to FIG. 15, the compensated image data generator 50 may include a memory 510, a timer 520, a compensation amount calculator 530, a lookup table 540, a data adder 550, and an image data compensator 560.

The memory 510 may store luminance values initially set in accordance with corresponding accumulated light emission times.

The display device according to an exemplary embodiment of the present invention may operate in the digital driving method, and thus an amount of the driving current IOLED flowing through each second OLED of the PXs may be substantially the same, regardless of the image data DR, DG, and DB. The timer 520 may measure an accumulated light emission time of the first OLED of the dummy pixel 90 and transmit the accumulated light emission time of the first OLED to the compensation amount calculator 530.

The compensation amount calculator 530 may calculate the first compensation amount of image data DR, DG, and DB according to the accumulated light emission time of the first OLED by using the luminance value and the accumulated light emission time measured in the dummy pixel 90.

The compensation amount calculator 530 may store the first calculated compensation amount in the lookup table 540 in accordance with corresponding accumulated light emission time.

In more detail, the compensation amount calculator 530 may be inputted with a luminance value of the dummy pixel 90 measured by the photo sensor 420 and a luminance value initially set in the memory 510. The compensation amount calculator 530 may compare the measured luminance value to the initially set luminance value in order to calculate a decreased luminance degree. The decreased luminance degree may refer to a difference between a luminance when a driving current IOLED flows through the first OLED and the initially set luminance.

Then, the compensation amount calculator 530 may calculate an increased amount of the accumulated light emission time of the first OLED and yield the first compensation amount that may compensate the decreased luminance degree. The relationship between the decreased luminance degree of the first OLED and the increased accumulated light emission time may be represented as a function (F(t)) based on experimental data.

According to an exemplary embodiment of the present invention, the function (F(t)) may represent an increased pulse width of a data voltage corresponding to image data DR, DG, and DB to compensate for the decreased luminance degree according to the accumulated light emission time. For example, assuming that an increased data-voltage applying time to compensate for the decreased luminance degree is proportional, and assuming that a decreased luminance degree is 0.1% when a light emission time of the first OLED 20 hours, the function (F(T)) may derive the data-voltage applying time corresponding to the image data DR, DG, and DB to increase by 0.1%. More particularly, the function (F(t)) may be an equation to calculate an increased data-voltage applying time (i.e., a compensation amount) required to maintain a luminance of a predetermined gray level of the image data DR, DG, and DB.

The data adder 550 may receive the image data DR, DG, and DB and add the image data DR, DG, and DB of each pixels PXs respectively accumulated in accordance with corresponding pixels PXs. The image data DR, DG, and DB respectively accumulated in accordance with corresponding pixels PXs is information that may correspond to the accumulated light emission time of each pixel PX, and the data adder 550 may generate information about the accumulated light emission time corresponding to the accumulated and added image data DR, DG, and DB of each pixels PXs.

The image data compensator 560 may detect an accumulated light emission time of each of the second OLEDs of the pixels PXs, identify the second compensation amount from the lookup table corresponding to the accumulated light emission time, and modify image data DR, DG, and DB of the second OLED according to the detected second compensation amount. The image data compensator 560 may repeatedly identify the second compensation amount each time when a compensation unit time elapses, to modify the image data DR, DG, and DB.

Accordingly, the compensated image data generator 50 may achieve overall uniform luminance of the display area DA. Therefore, an image sticking phenomenon may be prevented or efficiently reduced, and the pixel deterioration may be compensated.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:
1. A display device, comprising:
   a first substrate comprising a display area and a non-display area;
   a second substrate disposed opposite to the first substrate;
   a connector connected to a first surface of each of the first and second substrates, the connector covering at least a portion of a side surface of each of the first and second substrates;
   a photo sensor disposed on the connector and facing the side surface of the first substrate, the photo sensor configured to measure a luminance value of a pixel disposed on the non-display area; and a fixing member disposed between the first substrate and the connector,
wherein the photo sensor is inserted into the fixing member.

2. The display device of claim 1, wherein:
at least a portion of the first substrate is inserted into the fixing member; and
the fixing member comprises an aperture configured to pass light therethrough.

3. The display device of claim 2, wherein the photo sensor is inserted into the fixing member and faces the aperture of the fixing member.

4. The display device of claim 2, wherein the fixing member comprises:
a first portion disposed on the first surface of the first substrate;
a second portion opposite to the first portion and disposed on a second surface of the first substrate; and
a side wall portion connecting the first and second portions,
wherein the side wall portion comprises an inserting groove.

5. The display device of claim 4, wherein the photo sensor is disposed on the inserting groove.

6. The display device of claim 1, wherein:
the fixing member contacts the first and second surfaces of the first substrate; and
the first surface is opposite to the second surface.

7. The display device of claim 1, further comprising:
a driving-chip mounting film connected to the display panel, the driving-chip mounting film configured to apply a driving signal to the display panel; and
a printed circuit board (PCB) connected to the driving-chip mounting film.

8. The display device of claim 7, wherein a first end portion of the connector is connected to the PCB.

9. The display device of claim 7, wherein the fixing member is disposed between the driving-chip mounting films.

10. The display device of claim 1, further comprising an optical film disposed between the photo sensor and the fixing member.

11. The display device of claim 1, wherein the fixing member is connected to the connector.

12. The display device of claim 1, wherein the fixing member further comprises a coupling protrusion.

13. The display device of claim 12, wherein the connector further comprises a coupling hole into which the coupling protrusion is inserted.

14. The display device of claim 1, wherein the connector is a flexible printed circuit board (FPCB).

15. A display device, comprising:
a first substrate comprising a display area and a non-display area;
a second substrate disposed opposite to the first substrate;
a connector connected to the first and second substrates and covering a portion of a side surface of at least one of the first and second substrates; and
a photo sensor disposed on the connector and facing the side surface of the first substrate,
wherein the photo sensor is configured to measure a luminance value of a pixel disposed on the non-display area.

16. The display device of claim 15, further comprising a compensated image data generator configured to:
calculate a first compensation amount based on the measured luminance value and an accumulated light emission time of a first OLED disposed on the non-display area;
calculate a second compensation amount based on an accumulated light emission time of a second OLED disposed on the display area; and
compensate image data of the second OLED according to the second compensation amount.

17. The display device of claim 16, wherein the compensated image data generator comprises:
a memory storing an initial luminance value;
a timer configured to measure an accumulated light emission time of the first OLED;
a data adder configured to accumulate and add image data corresponding to the second OLED disposed on the display area;
a compensation amount calculator configured to calculate the second compensation amount of image data corresponding to the accumulated light emission time of the second OLED, based on the measured luminance value, the initial luminance value, and the accumulated light emission time of the first OLED; and
an image data compensator configured to detect the accumulated light emission time of the second OLED and modify image data of the second OLED according to the second compensation amount that corresponds to the detected accumulated light emission time.

18. The display device of claim 17, wherein the compensation amount calculator is configured to:
calculate a decreased luminance degree based on the measured luminance value and the initial luminance value; and
yield an increased accumulated light emission time corresponding to the calculated decreased luminance degree as the compensation amount.

19. The display device of claim 17, wherein the compensated image data generator further comprises a lookup table configured to store the first compensation amount calculated by the compensation amount calculator according to corresponding accumulated light emission time of the first OLED.

20. The display device of claim 1, wherein:
a portion of the first substrate comprising a chamfered edge is inserted to the fixing member.

* * * * *